United States Patent [19]

Oyama et al.

[11] Patent Number: 5,515,408

[45] Date of Patent: May 7, 1996

[54] FUEL ASSEMBLY

[75] Inventors: Junichi Oyama; Akihiro Kato, both of Naka; Masaji Mori, Kobe; Toshiyuki Kawagoe, Tokyo; Kazuichi Suzuki, Kobe; Hitoshi Inada, Naka; Hiromasa Miyai, Kobe, all of Japan

[73] Assignees: Mitsubishi Nuclear Fuel Co.; Mitsubishi Jukogyo Kabushiki Kaisha, Tokyo, Japan; a part interest

[21] Appl. No.: 352,849

[22] Filed: Dec. 2, 1994

[30] Foreign Application Priority Data

Dec. 3, 1993 [JP] Japan ..................... 5-304461

[51] Int. Cl.$^6$ ..................... G21C 7/00
[52] U.S. Cl. ..................... 376/434; 376/439; 376/441; 376/443; 376/438
[58] Field of Search ..................... 376/434, 439, 376/441, 443, 438; 976/DIG. 60, DIG. 78, DIG. 79

[56] References Cited

U.S. PATENT DOCUMENTS

| 3,862,000 | 1/1975 | Pugh et al. ..................... 376/439 |
| 4,426,355 | 1/1984 | Burger ..................... 376/442 |
| 4,895,698 | 1/1990 | DeMario ..................... 376/442 |
| 5,110,539 | 5/1992 | Perrotti et al. ..................... 376/439 |
| 5,272,741 | 12/1993 | Masuhara et al. ..................... 376/439 |
| 5,327,472 | 7/1994 | Kraemer et al. ..................... 376/439 |

FOREIGN PATENT DOCUMENTS

| 0349408 | 1/1990 | European Pat. Off. . |
| 0468871 | 1/1992 | European Pat. Off. . |
| 2352373 | 12/1977 | France . |

*Primary Examiner*—Donald P. Walsh
*Assistant Examiner*—Meena Chelliah
*Attorney, Agent, or Firm*—Oblon, Spivak, McClelland, Maier & Neustadt

[57] ABSTRACT

A fuel assembly is presented in which a plurality of support grids are disposed along the longitudinal direction of the fuel rods. The straps forming the grid cells of the support grids are provided with mixing vanes for generating turbulent flow of the cooling water passing through the grid cells. In a plan view of the support girds, each of the mixing vanes protrudes inwardly of the grid cells and is disposed along a positive diagonal direction and a negative diagonal direction. This configuration of the mixing vanes are effective in preventing the generation of systematic vibrations in the fuel assembly by canceling the effects of the turbulent flows of the cooling water. The direction of protrusion of the mixing vanes can be in two diagonal directions within one support grid, or it can be unidirectional along either diagonal direction within one support grid.

12 Claims, 6 Drawing Sheets

FUEL ASSEMBLY

BACKGROUND OF THE INVENTION

1. Field of the Invention

The present invention relates to a fuel assembly used for a nuclear reactor, and relates in particular to a device for systematic vibration prevention.

2. Technical Background

An example of a fuel assembly for use in a pressurized light water reactor is shown in FIG. 9.

In this drawing, the fuel assembly is provided with an upper nozzle 1, and a lower nozzle 2 which is oppositely spaced apart from the upper nozzle 1. A plurality of control rod guide pipes 3 are fixedly disposed between the upper nozzle 1 and the lower nozzle 2, and a plurality of support grids 4 are attached to the control rod guide pipes 3 in the middle section of the fuel assembly.

As shown in FIGS. 10 and 11, the support grid 4 comprises a plurality of straps 7 crossing at right angles to each other to produce a grid network and a plurality of grid cells 5 therein. A plurality of dimples 9 and springs 10 are provided on the opposing walls surrounding the grid cells 5 to provide support to the fuel rods 6 passing through the grid cells 5. The fuel rods 6 are elastically held in the grid cells 5 by being pressed by the springs 10 against the dimples 9.

In a perspective plan view of a grid cell shown in FIG. 11, it is seen that a pair of mixing vanes 11 protrude from the top edge near the intersections of the crossing straps 7. The function of the mixing vanes 11 is to generate a turbulent flow of cooling water for efficient removal of the heat generated by the fuel rod 6.

The mixing vanes 11 are bent inward of the grid cell 5 at the top edge of the strap 7 so that the flow of the cooling water forcibly directed upwards from below (in the drawing) will be disturbed and stirred by the mixing vanes 11. The direction of the bend of the mixing vanes is determined as follows.

As shown in a plan view of the support grid 4 in FIG. 12, a pair of mixing vanes 11 are disposed at opposing corners (lower right and upper left corners in FIG. 12) of each of the gird cells 5, and are bent inwards on the open space of the grid cells 5 throughout an entire fuel assembly.

However, in such a configuration, because the mixing vanes 11 are disposed unidirectionally in a diagonal direction in the support grid 4, the cooling water is extremely vulnerable to cause vibration of the entire fuel assembly due to an unbalanced vibrational attenuation characteristics of each support grid. Furthermore, if vibrations are generated in the fuel rods 6, the fuel rods 6 are subjected to unidirectional vibrational forces (in the direction of arrow a in FIG. 12), thus worsening the resulting systematic vibration of the fuel assembly.

SUMMARY OF THE INVENTION

The present invention of the arrangement pattern of the mixing vane relates to prevention of vibrations caused by turbulent flows of cooling water in a fuel assembly.

The objective of preventing the systematic vibrations is achieved in a fuel assembly comprising: an upper nozzle and a lower nozzle separated at a distance from said upper nozzle; a plurality of support grids, disposed between said upper nozzle and said lower nozzle with pre-determined spacing, each support grid having grid cells formed by intersecting straps having dimples and springs formed on walls of said grid cells, and mixing vanes formed on upper transverse corners of each of said grid cells; instrument pipes and guide pipes inserted in said grid cells of said grids and fixed on said upper nozzle and on said lower nozzle; and fuel rods inserted into said grid cells of said grids and supported elastically by said dimples and said springs; wherein said mixing vanes are disposed so as to face inward and be aligned on a first diagonal and on a second diagonal in a plan view of said grid cells of said support grids throughout the entire fuel assembly.

According to such an arrangement pattern of the mixing vanes, even if the vibrational forces caused by the turbulent flows were to act on the fuel assembly, the vibrations along the diagonal directions and along the strap directions in the entire fuel assembly cancel each other because of superior damping characteristics achieved by the balanced arrangement of the mixing vanes. If vibrations should be generated in the fuel rods, because the mixing vanes are disposed along opposing diagonal directions, it is clear that the vibrations can cancel each other thereby preventing the vibrations in the fuel assembly as a whole.

Another aspect of the invention is that in a plan view of the support grid, the number of mixing vanes disposed along the first diagonals is about the same as the number of mixing vanes disposed along the second diagonals.

Therefore, even if the vibrational forces caused by the turbulent flows were to act on the fuel assembly, the vibrations along the diagonal directions and along the strap directions in each support gird cancel each other because of superior damping characteristics achieved by the balanced arrangement of the mixing vanes. Further, if vibrations should be generated in the fuel rods, because the number of mixing vanes are equal along opposing diagonal directions, it is clear that the vibrations in one group of fuel rods act at right angles to the vibrations of the other group of fuel rods, thereby nullifying and preventing the vibrations in the fuel assembly as a whole.

According to another aspect of the invention, the fuel assembly comprises a first support grid having the mixing vanes disposed only along the first diagonal direction and a second support grid having the mixing vanes disposed only along the second diagonal direction which becomes coincident with the first diagonal direction with a 90 degree turn.

If vibrations should be generated in the fuel rods, because the arrangement of the mixing vanes is well balanced, the vibrations caused by turbulent flows in the first support grids oppose the vibrations caused in the second support grids, thereby preventing systematic vibrations in the fuel assembly as a whole.

According to yet another aspect of the invention, the fuel assembly comprises a first support grid having the mixing vanes disposed only along the first diagonal direction, a second support grid having the mixing vanes disposed only along the second diagonal direction, and a third support grid having about the same number of mixing vanes disposed on the first diagonal and the second diagonal directions.

If vibrations should be generated in the fuel rods, judicious arrangement of these three types of support grids provides further overall vibration control for the fuel assembly.

PREFERRED EMBODIMENTS

Figure 1:
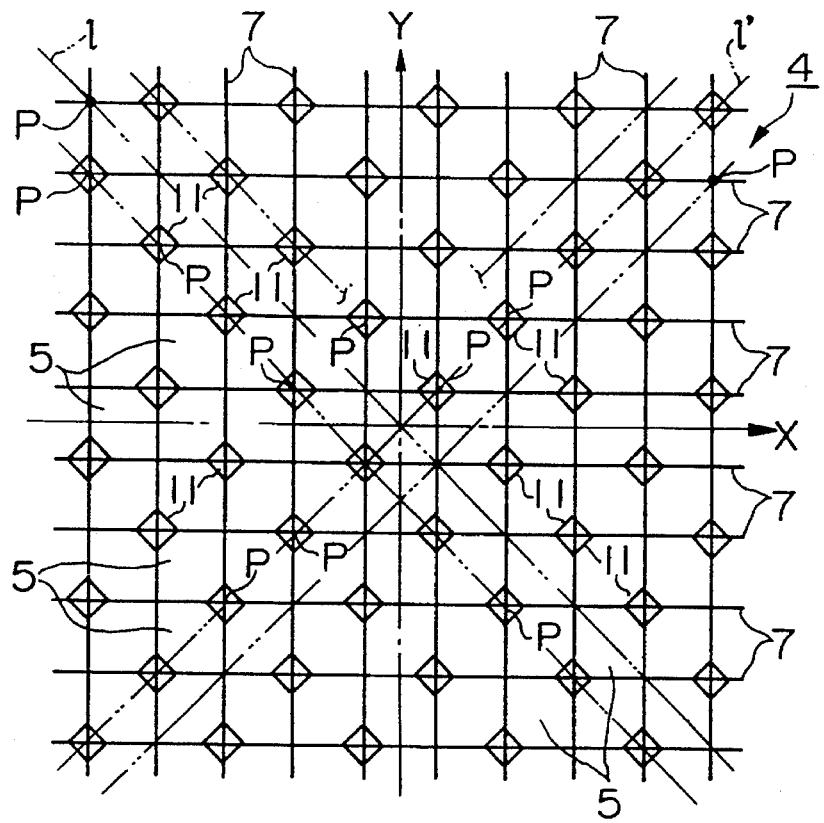
FIG. 1 is a schematic plan view of a section of the support grid in a first embodiment of the present invention.

Preferred embodiments will be explained with reference to FIGS. 1 to 8. Those parts of the fuel assembly which are the same or similar to the conventional fuel assembly are given the same reference numerals, and their explanations are omitted.

FIG. 1 shows a plan view of the arrangement pattern of the mixing vanes in the first embodiment.

The mixing vanes 11 are disposed on the gird 4 in the following manner.

In a plan view of the support grid 4, two diagonal lines are shown. One diagonal line 1 (shown by double dot line) going through the intersection points P of the straps 7 has a negative slope (referred to as a negative slope diagonal, or a second diagonal) while the other diagonal line 1' has a positive slope (referred to as a positive slope diagonal, or a first diagonal). At every point P located on every other diagonal lines 1, 1', there are disposed four mixing vanes 11 bent inwards of the grid cells 5. In another point of view, a pair of mixing vanes 11 are disposed in the positive direction for each grid cell 5 at e.g. a chessboard white position and in the negative direction for each grid cell 5 at a chessboards black position.

In the support grid 4 having the arrangement pattern of the mixing vanes 11 in the first embodiment, the number of vanes 11 in the positive slope direction is equal to the number of vanes 11 in the negative slope direction. Also, the arrangement of the vanes 11 about the point P is symmetrical with respect to the center point of the support grid 4.

Therefore, the mixing vanes 11 are disposed in a balanced pattern with respect to the opposing diagonal directions as well as the lengthwise directions X, Y of the straps 7. Therefore, when vibrations are caused in the fuel assembly by the turbulent flows, the vibration damping in the two diagonal directions are made essentially equal to each other and the vibration damping in the X- and Y-directions are made essentially equal to each other, and the fluid dynamic response characteristics of the fuel assembly are well balanced.

Further, even if vibrations are generated in the fuel rods 6 due to the turbulent flows generated by the mixing vanes 11, because the mixing vanes 11 are disposed symmetrically, the vibration from one rod is in a direction to cancel the vibration from an adjacent rod, and the vane configurations has an effect of diminishing the systematic vibration generation in the entire fuel assembly.

Further, because the number of mixing vanes 11 bent inwards of each grid cell 5 (two vanes per grid cell) is the same as that in the conventional grid cells 5, there is no increase in the pressure needed to circulate the cooling water.

Figure 2:
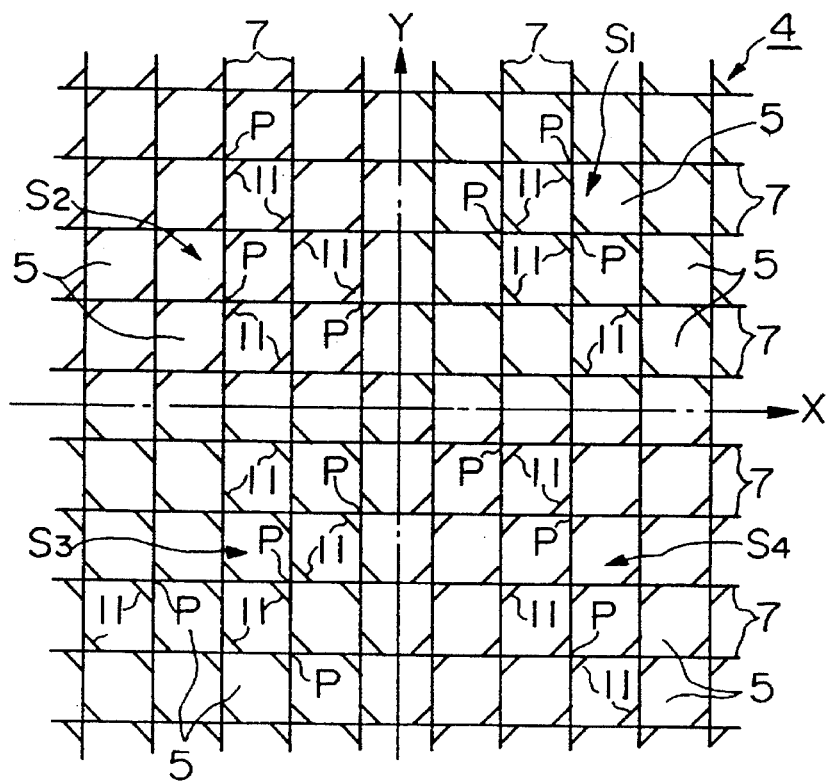
FIG. 2 is a schematic plan view of a section of the support grid in a second embodiment of the present invention.

FIG. 2 presents a second embodiment. The arrangement of the mixing vanes 11 is as follows.

A plan view of the support grid 4 in FIG. 2 is divided into four quadrants, S1, S2, S3 and S4, with the center at the center of the support grid 4. In the first and the third quadrants, S1, S3 the mixing vanes 11 are disposed on the positive slope diagonals while in the second and the fourth quadrants, S2, S4 the mixing vanes 11 are disposed on the negative slope diagonals.

By adopting such a configuration, the number of mixing vanes 11 on the positive slope diagonals is the same as that on the negative slope diagonals, and also that the mixing vanes 11 are distributed in a four-fold mirror symmetry about the center of the support grid 4.

Therefore, the mixing vanes 11 are disposed in a balanced pattern with respect to the opposing diagonal directions as well as the lengthwise directions X, Y of the straps 7. Therefore, when vibrations are caused in the fuel assembly by the turbulent flows, the vibration damping in the two diagonal directions are made essentially equal to each other and the vibration damping in the X- and Y-directions are made essentially equal to each other, and the fluid dynamic response characteristics of the fuel assembly are well balanced.

Further, when the vibrations of the fuels rods 6 are caused by the turbulent flows of the cooling water, because the mixing vanes 11 are placed symmetrically with respect to the center of the support grid 4, the vibrations generated in the quadrants S1, S3 are in a cancelling relationship to the vibrations generated in the quadrants S2, S4, thereby reducing the systemtic vibration generation in the entire fuel assembly.

Further, because the number of mixing vanes 11 in each grid cell 5 is two as in the conventional grid, there is no increase in the pressure necessary to circulate the cooling water.

A variation of the second embodiment is to reverse the direction of the mixing vanes 11 in each quadrant, with that in the second embodiment.

Figure 3:
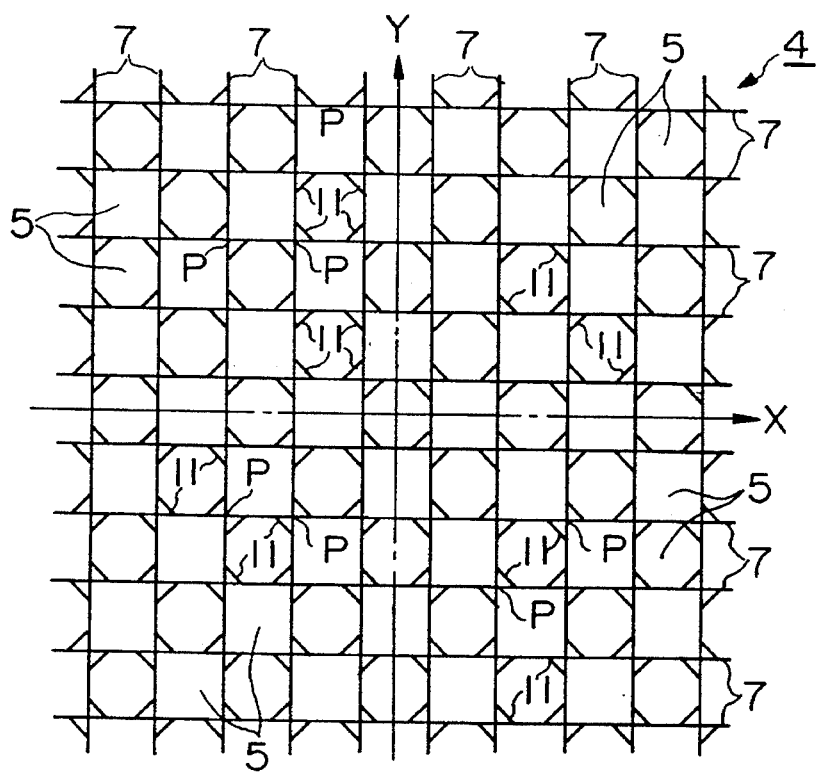
FIG. 3 is a schematic plan view of a section of the support grid in a third embodiment of the present invention.

FIG. 3 presents a third embodiment. The arrangement of the mixing vanes 11 is as follows.

A plan view of the support grid 4 in FIG. 3 shows an arrangement pattern of the mixing vanes 11 such that at the intersection points P on every other row and column of the support grid 4, there are provided two mixing vanes 11. In the X- and Y-directions, every point P has two mixing vanes 11 which are related by 90 degree turn. In such an arrangement pattern for the mixing vanes, the number of mixing vanes 11 on the positive slope diagonals is the same as that on the negative slope diagonals, and also that the mixing vanes 11 are distributed in a four-fold symmetry about the center of the support grid 4.

Therefore, the mixing vanes 11 are disposed in a balanced pattern with respect to the opposing diagonal directions as well as the lengthwise directions X, Y of the straps 7.

Therefore, when vibrations are caused in the fuel assembly by the turbulent flows, the vibration damping in the two diagonal directions are made essentially equal to each other and the vibration damping in the X- and Y-directions are made essentially equal to each other, and the fluid dynamic response characteristics of the fuel assembly are well balanced.

Further, even if vibrations were generated in the fuel rods 6 due to the turbulent flows generated by the mixing vanes 11, because the mixing vanes 11 are disposed symmetrically, the vibration from one rod is in a direction to cancel the vibration from an adjacent rod, and the vane configurations has an effect of diminishing the systematic vibration generation in the entire fuel assembly.

The embodiments above presented particular arrangement patterns of the mixing vanes as typical examples of controlling the generation of vibrations, however, what is important is the overall arrangement pattern of the vanes 11. It is necessary that the support grids 4 overall has a balanced arrangement of the mixing vanes 11 throughout the entire fuel assembly. The absolute necessary requirements are that the mixing vanes 11 disposed on the positive slope diagonals be as nearly the same as practical to the number of mixing vanes 11 disposed on the negative slope diagonals, and that the arrangement patterns of each of the mixing vanes 11 be well balanced, i.e., the flow of the cooling water must not all be directed in the same direction in each grid cell 5.

Figure 4:
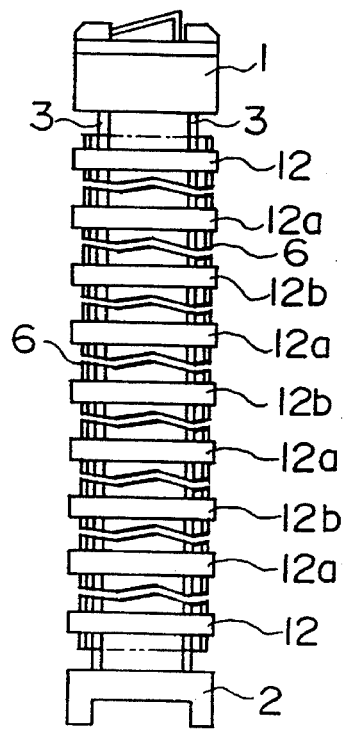
FIG. 4 is a schematic front view of the fuel assembly in a fourth embodiment of the present invention.
Figure 5:
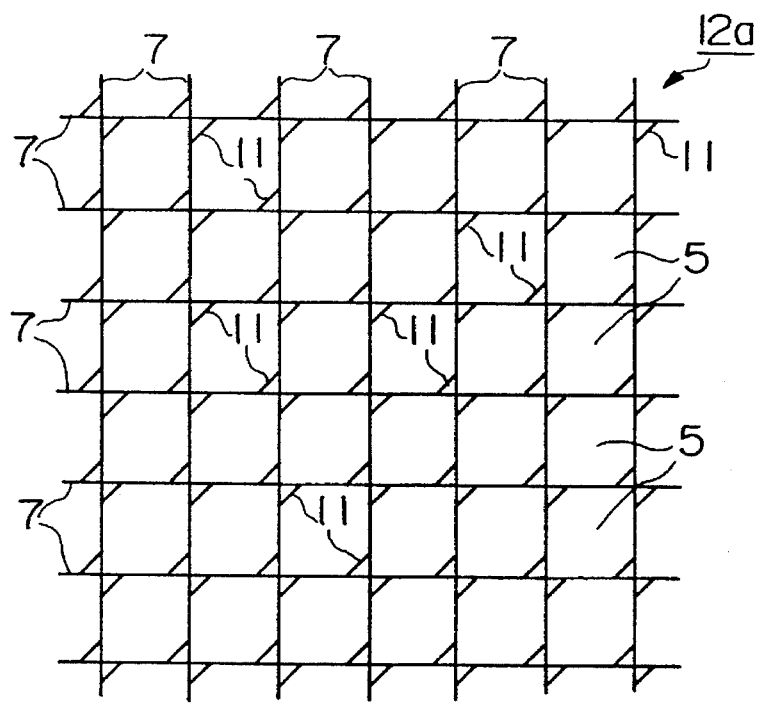
FIG. 5 is a schematic plan view of the first support grid in the fourth embodiment.
Figure 6:
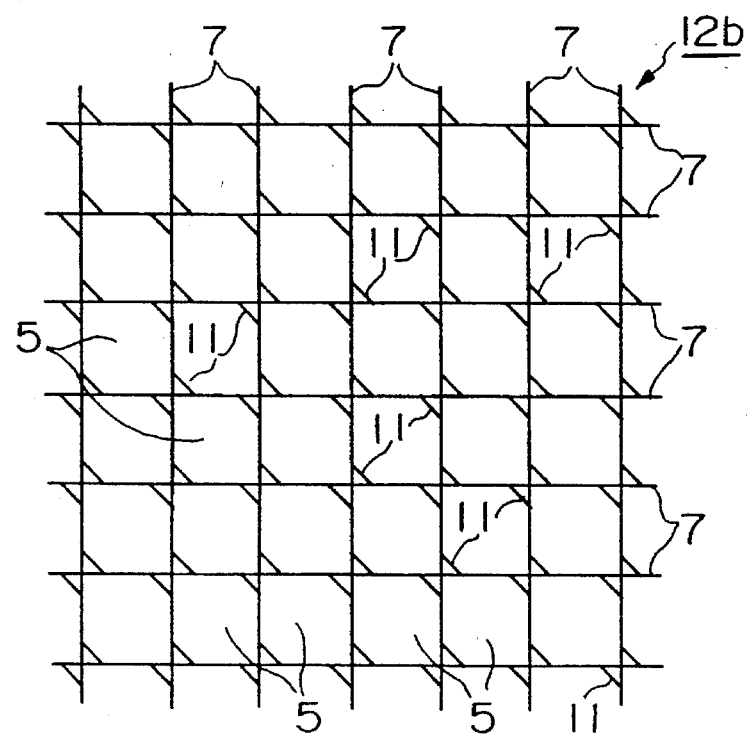
FIG. 6 is a schematic plan view of the second support grid in the fourth embodiment.

A fourth embodiment will be presented with reference to FIGS. 4 to 6.

The fuel assemblies shown in FIGS. 4 to 6 have a top grid 12 and a bottom grid 12 neither of which have any mixing vanes 11. Between the top and bottom grids 12, several support grids 12a, 12b having the mixing vanes 11 are disposed. (In FIG. 4, there are seven support grids shown.)

More specifically, the 2nd, 4th, 6th and 8th support grids 12a have the mixing vanes 11 disposed on the negative slope diagonals (refer to FIG. 5). The 3rd, 5th and 7th support grids 12b have the mixing vanes 11 disposed on the positive slope diagonals (refer to FIG. 6).

The fuel assembly having a different arrangement pattern of the mixing vanes in alternating support grids 12a, 12b will appear, in its plan view, to have a four-fold symmetry of the vane arrangement.

It will be evident that those support grids 12b disposed at the 3rd, 5th and 7th positions become coincident with the support grids 12a disposed on 2nd, 4th, 6th and 8th positions by a 90 degree rotation.

By disposing the support grids 12a, 12b having an alternating symmetrical patterns of mixing vane arrangement, the vibrations in the fuel rods 6 which occur in the adjacent support grids 12a, 12b in the longitudinal direction of the fuel assembly act to cancel each other, and the arrangement of the mixing vanes has an overall effect of diminishing the systematic vibration generation in the entire fuel assembly.

Further, because the alternating patterns of support grids 12a, 12b can be produced by using a support grid having one arrangement pattern and rotating the support grid by 90 degrees about the center of the support gird when necessary, the effort required for manufacturing the alternating pattern is more or less the same as that for the conventional process.

Figure 7:
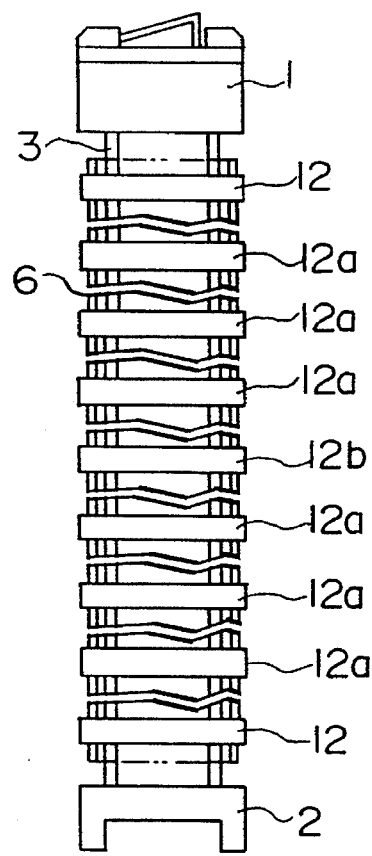
FIG. 7 is a schematic front view of the fuel assembly in a fifth embodiment of the present invention.

FIG. 7 presents a fifth embodiment. This embodiment relates to a fuel assembly in which there is only one middle support grid 12b having a different arrangement of the mixing vanes from the other support grids 12a.

This disposing of the support grids 12a, 12b is adopted for the following reason. In the conventional disposing of support grids having the mixing vanes placed in the same direction only, when vibrations are generated in the fuel rods 6, the largest amplitude of vibrations occurs near the middle portions of the fuel rods 6. For this reason, in the fifth embodiment, the direction of the mixing vanes 11 in the middle support grid 12b is made opposite to that in the rest of the support grids 12a. By adopting this arrangement of the support grids 12a, 12b, the vibrations in the middle portion of the fuel rods 6 are controlled and the systematic vibration in the entire fuel assembly is controlled.

Further vibration control can be achieved effectively by having more mixing vanes 11 in the middle support grid 12b than in the support grids 12a, or by altering the angle of bend of the mixing vanes 11.

The above-described fourth and fifth embodiments were based on arranging support grids 12a, 12b having mixing vanes 11 aligned in different directions. However, the present invention is not limited to such a configuration, and it is only necessary that when viewing the fuel assembly as a whole, the support grids 12a, 12b having different alignment directions be placed in a suitable pattern so as to achieve a balanced stirring of the cooling water in the longitudinal direction of the fuel rods 6.

Furthermore, regarding the overall arrangement of the plurality of support grids in a fuel assembly, it is necessary that the total number of mixing vanes along the positive diagonals be approximately the same as the total number of mixing vanes along the negative diagonals. The fuel assembly having such an arrangement of the support grids will be able to cancel the fuel rod vibrations caused by turbulent flow of the cooling water. In this case, it is not necessary that, in each support gird, the number of mixing vanes along the positive and negative diagonals be the same.

For example, those support grids 4 presented in the first to third embodiments having about the same number of mixing vanes disposed along the positive and negative slope diagonals can be used together with those support grids 12a, 12b presented in the fourth embodiment having the mixing vanes disposed along one diagonal so long as the fuel assembly as a whole has the same number of mixing vanes along the two diagonal directions.

Figure 8:
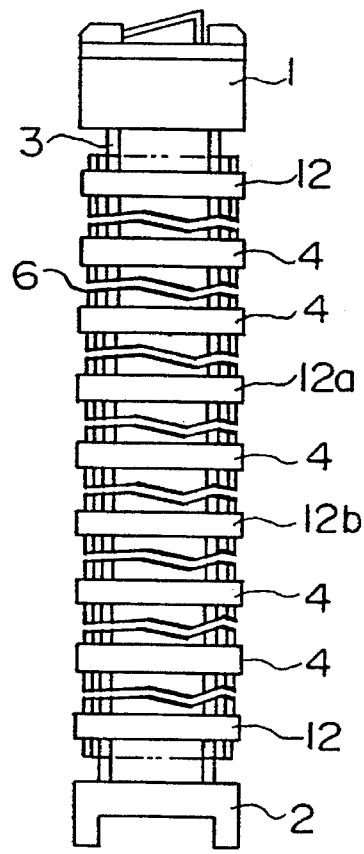
FIG. 8 is a schematic front view of the fuel assembly in a sixth embodiment of the present invention.
Figure 12:
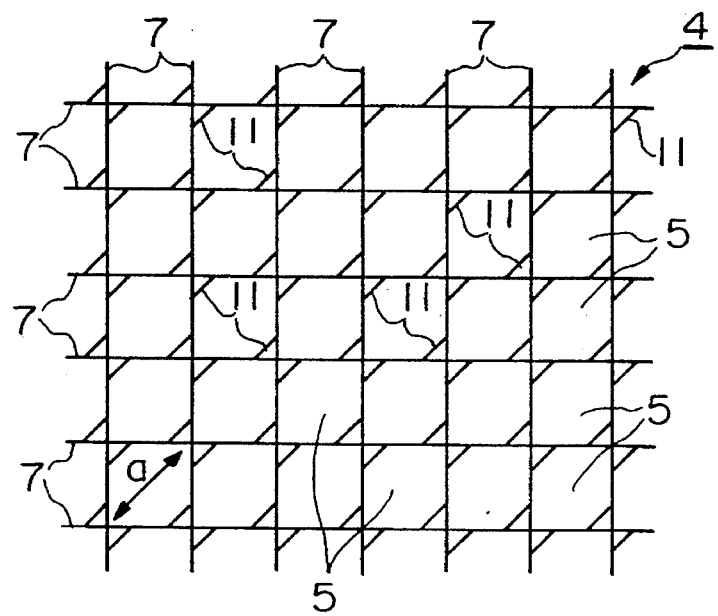
FIG. 12 is a schematic plan view of the conventional arrangement of the mixing vanes in a support grid.
Figure 9:
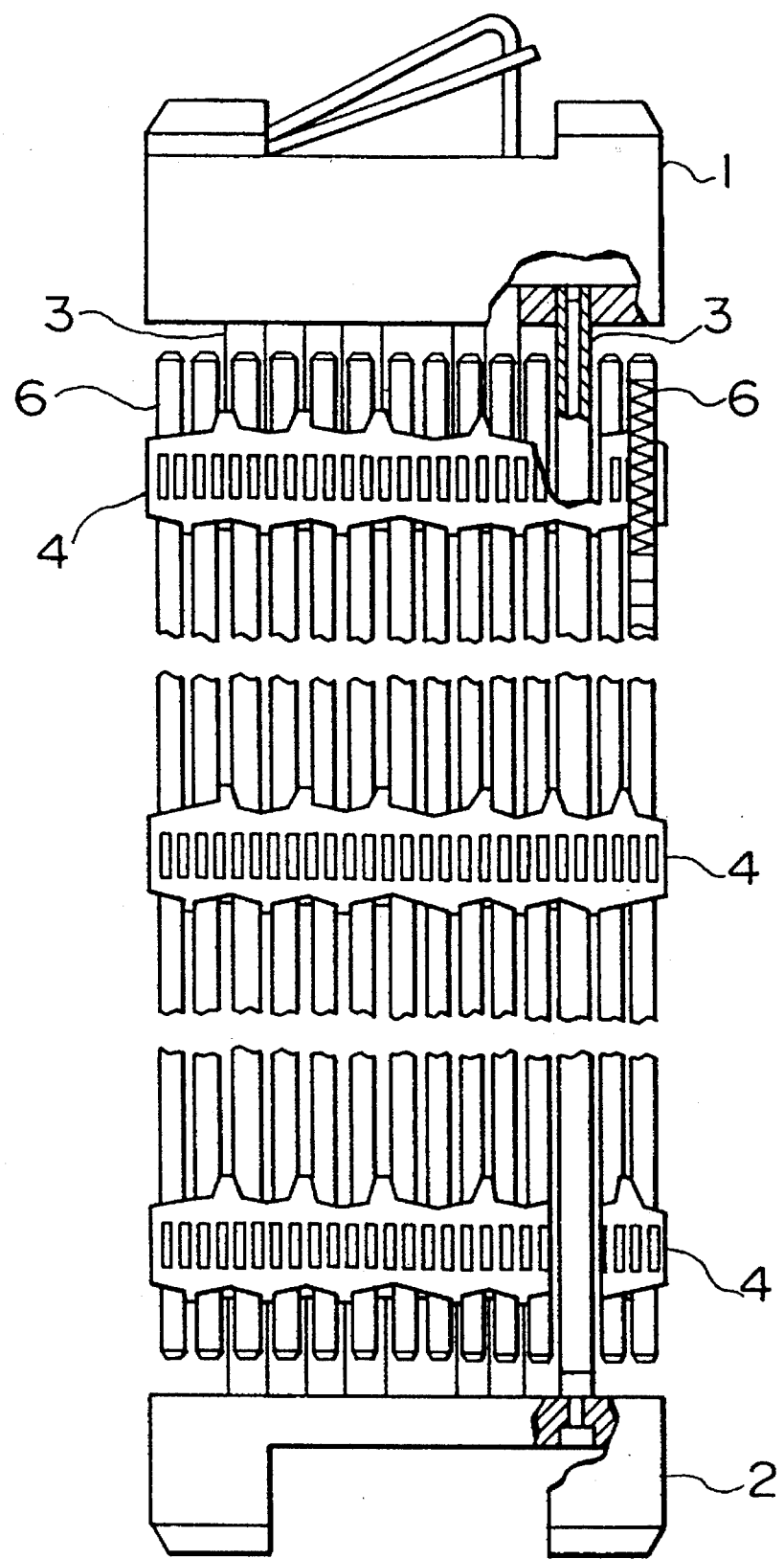
FIG. 9 is a schematic illustration of the structure of a fuel assembly.
Figure 10:
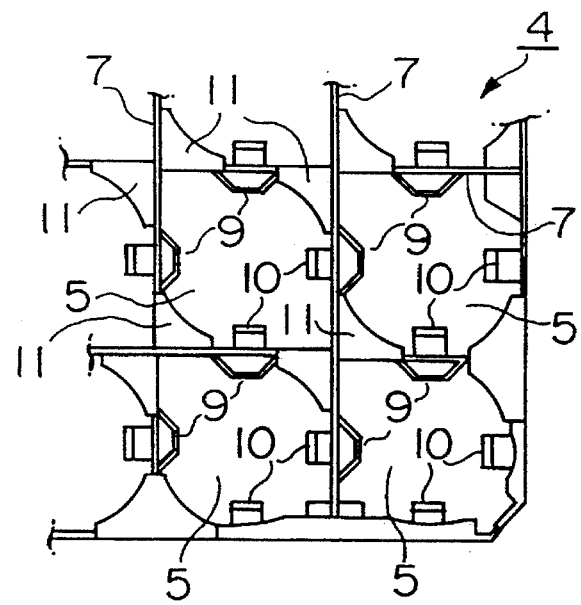
FIG. 10 is a schematic sectional representation of a conventional support grid.
Figure 11:
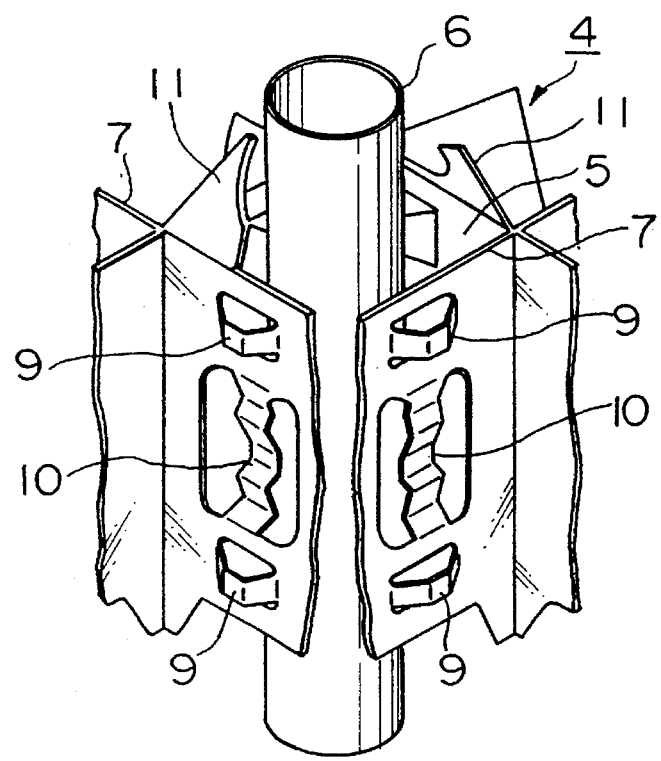
FIG. 11 is an illustration of a fuel rod held in a grid cell.

Such an example is shown in FIG. 8. In this fuel assembly, there are disposed a plurality of support grids 4 having abut the same number of mixing vanes along the two diagonal directions (five shown in FIG. 8). Above and below the central support grids 4, a support grid 12a, having the mixing vanes 11 disposed along the first diagonal direction, is disposed symmetrically with a support grid 12b having the mixing vanes disposed along the second diagonal direction.

Or, those support grids 4 presented in the first to third embodiments having about the same number of mixing vanes disposed along the positive and negative diagonals can be used together with those support grids 12a, 12b presented in the fourth embodiment having the mixing vanes disposed along one diagonal, by having different numbers of mixing vanes along the two diagonal directions in the fuel assembly as a whole but arranging the support grids in such a pattern to balance the effects of turbulent flows of the cooling water.

With reference to FIG. 8, this can be achieved by replacing one of the support grids 4 with 12a, for example, by replacing the third support gird 4 from the bottom support gird 12 with a support grid 12a having the mixing vanes along the first diagonals so as to avoid any residual turbulence which might exist in a symmetrical arrangement of the grids 12a and 12b.

What is claimed is:

1. A fuel assembly comprising: an upper nozzle and a lower nozzle separated at a distance from said upper nozzle; a plurality of support grids, disposed between said upper nozzle and said lower nozzle with a pre-determined spacing, each support grid having grid cells formed by intersecting straps having dimples and springs formed on walls of said grid cells, and mixing vanes formed on upper transverse corners of each of said grid cells; instrument pipes and guide pipes inserted in said grid cells of said grids and fixed on said upper nozzle and on said lower nozzle; and fuel rods inserted into said grid cells of said grids and supported elastically by said dimples and said springs;

wherein said mixing vanes are bent to face inward of said grid cell and are essentially disposed on a first diagonal direction and on a second diagonal direction in a plan view of said support grids in the entire fuel assembly, wherein essentially two mixing vanes per grid cell are disposed in each of said support grids.

2. A fuel assembly as claimed in claim 1, wherein said fuel assembly is provided with an arrangement in a plan view of said support grids so that a total number of said mixing vanes disposed along said first diagonal direction is essentially equal to a total number of said mixing vanes disposed along said second diagonal direction.

3. A fuel assembly as claimed in claim 2, wherein a number of mixing vanes disposed on said first diagonal direction is essentially the same as the number of mixing vanes disposed on said second diagonal in a plan view of said grid cells of each support grid.

4. A fuel assembly as claimed in claim 3, wherein each intersection point P lying on every other diagonal line in one diagonal direction of either said first diagonal direction or said second diagonal direction in a plan view of said support grid is associated with four mixing vanes, each of which is protruding inwards of each Of said grid cells surrounding said intersection point P.

5. A fuel assembly as claimed in claim 3, wherein said mixing vanes of said support grids are disposed in a four-fold symmetry with respect to a center of said support gird.

6. A fuel assembly as claimed in claim 5, wherein four quadrants are designated about a center of said support grid in a counter-clockwise direction in a plan view of said support grid, and said mixing vanes in a first quadrant and in an opposing third quadrant are disposed along said first diagonal directions while mixing vanes in a second quadrant and an opposing fourth quadrant are disposed along said second diagonal directions.

7. A fuel assembly as claimed in claim 1, wherein said fuel assembly is provided with at least one or a plurality of each of support grids consisting of a first support grid having said mixing vanes along said first diagonal directions, and a second support grid having said mixing vanes along said second diagonal directions, wherein said mixing vanes are disposed so as to be coincident by a 90 degree turn about a center axis of said support girds.

8. A fuel assembly as claimed in claim 7, wherein said fuel assembly is provided with an alternating stacking of said first support grids and said second support grids along a longitudinal direction of said fuel rods.

9. A fuel assembly as claimed in claim 7, wherein a plurality of said first support grids are disposed along said longitudinal direction of said fuel rods, and one said second support grid is disposed at a center location in said longitudinal direction of said fuel assembly.

10. A fuel assembly as claimed in claim 2, wherein said fuel assembly in a plan view comprises at least one or a plurality of each of: said first support grid having said mixing vanes disposed only along said first diagonal direction; said second support grid having said mixing vanes disposed only along said second diagonal direction; and a third support grid having essentially the same number of said mixing vanes disposed along said first diagonals and said second diagonal directions.

11. A fuel assembly as claimed in claim 1, wherein said fuel assembly in a plan view comprises at least one or a plurality of each of said first support grid having said mixing vanes disposed only along said first diagonal direction; said second support grid having said mixing vanes disposed only along said second diagonal direction; and third support grids having essentially the same number of said mixing vanes disposed along said first diagonals and said second diagonal directions.

12. A fuel assembly comprising: an upper nozzle and a lower nozzle separated at a distance from said upper nozzle; a plurality of support grids, disposed between said upper nozzle and said lower nozzle with a pre-determined spacing, each support grid having grid cells formed by intersecting straps having dimples and springs formed on walls of said grid cells, and mixing vanes formed on upper transverse corners of some of said grid cells; instrument pipes and guide pipes inserted in said grid cells of said grids and fixed on said upper nozzle and on said lower nozzle; and fuel rods inserted into said grid cells of said grids and supported elastically by said dimples and said springs;

wherein said mixing vanes are bent to face inward of said grid cells and are essentially disposed on a first diagonal direction and on a second diagonal direction in a plan view of said support grids, wherein said support grids essentially comprise a couple of said grid cells.

* * * * *